(12) United States Patent
Büttner et al.

(10) Patent No.: US 12,003,150 B2
(45) Date of Patent: Jun. 4, 2024

(54) ELECTRICAL MACHINE HAVING A PLASTIC LAYER AS A PHASE SEPARATOR

(71) Applicant: Innomotics GmbH, Nuremberg (DE)

(72) Inventors: Klaus Büttner, Hollstadt (DE); Tobias Katzenberger, Bad Königshofen STT Unteressfeld (DE); Bastian Plochmann, Neustadt an der Aisch (DE); Matthias Warmuth, Windshausen (DE)

(73) Assignee: Innomotics GmbH, Nuremberg (DE)

( * ) Notice: Subject to any disclaimer, the term of this patent is extended or adjusted under 35 U.S.C. 154(b) by 747 days.

(21) Appl. No.: 17/263,076

(22) PCT Filed: Jul. 24, 2019

(86) PCT No.: PCT/EP2019/069883
§ 371 (c)(1),
(2) Date: Jan. 25, 2021

(87) PCT Pub. No.: WO2020/025414
PCT Pub. Date: Feb. 6, 2020

(65) Prior Publication Data
US 2021/0313865 A1 Oct. 7, 2021

(30) Foreign Application Priority Data

Aug. 3, 2018 (EP) .................................. 18187323

(51) Int. Cl.
*H02K 3/28* (2006.01)
*H02K 3/38* (2006.01)
(Continued)

(52) U.S. Cl.
CPC ............. *H02K 15/105* (2013.01); *H02K 3/28* (2013.01); *H02K 3/38* (2013.01); *H02K 15/0081* (2013.01); *H02K 15/12* (2013.01)

(58) Field of Classification Search
CPC ...... H02K 15/12; H02K 15/0081; H02K 3/32; H02K 3/38; H02K 3/28; H02K 15/10
(Continued)

(56) References Cited

U.S. PATENT DOCUMENTS 4,219,748 A * 8/1980 Sakaguchi ............... H02K 3/50
310/260
2007/0149073 A1 6/2007 Klaussner et al.
(Continued)

FOREIGN PATENT DOCUMENTS

CN 101282066 A 10/2008
CN 103374792 A 10/2013
(Continued)

OTHER PUBLICATIONS

PCT International Search Report and Written Opinion of International Searching Authority dated Sep. 24, 2019 corresponding to PCT International Application No. PCT/EP2019/069883 filed Jul. 24, 2019.

*Primary Examiner* — Terrance L Kenerly
(74) *Attorney, Agent, or Firm* — Henry M. Feiereisen LLC

(57) ABSTRACT

A stator of a rotary electrical machine includes a laminated core having grooves, windings inserted into the grooves for forming a multi-phase winding system, and an insulating layer made of plastic and sprayed between partial winding overhangs of the windings of phases inserted immediately one after the other. The insulating layer is formed as a mesh-like structure having junctions and brace-like connections running between the junctions.

25 Claims, 9 Drawing Sheets

(51) Int. Cl.
*H02K 15/00* (2006.01)
*H02K 15/10* (2006.01)
*H02K 15/12* (2006.01)

(58) Field of Classification Search
USPC .......................................................... 310/208
See application file for complete search history.

(56) References Cited

U.S. PATENT DOCUMENTS

| | | |
|---|---|---|
| 2008/0246354 A1 | 10/2008 | Asao et al. |
| 2010/0187943 A1 | 7/2010 | Heim |
| 2013/0285275 A1 | 10/2013 | Lee et al. |
| 2014/0300239 A1 | 10/2014 | Takizawa et al. |
| 2023/0032311 A1* | 2/2023 | Büttner .................... B05D 5/10 |

FOREIGN PATENT DOCUMENTS

| | | | | |
|---|---|---|---|---|
| CN | 103427523 A | 12/2013 | | |
| DE | 2405450 * | 8/1974 | ............ | B05B 7/066 |
| DE | 11 2012 004 477 T5 | 7/2014 | | |
| GB | 603721 A | 6/1948 | | |
| JP | S61207160 A | 9/1986 | | |
| JP | 2006217679 A | 8/2006 | | |
| JP | 2015061491 A | 3/2015 | | |
| WO | WO 03/107512 A1 | 12/2003 | | |
| WO | WO 2017133840 A1 | 8/2017 | | |

\* cited by examiner

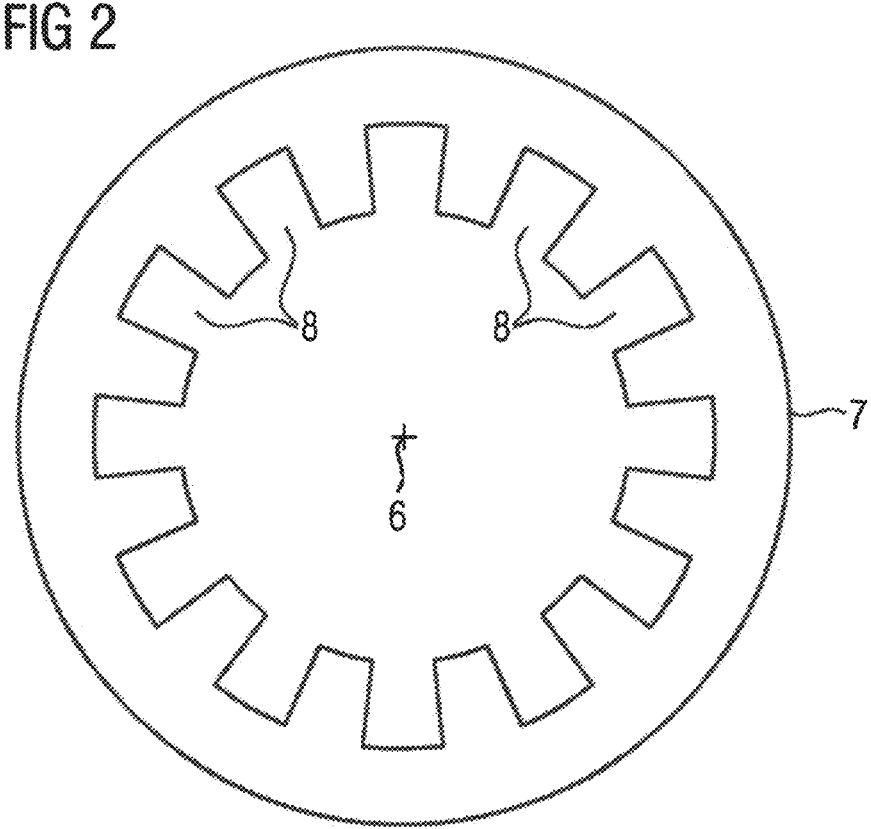
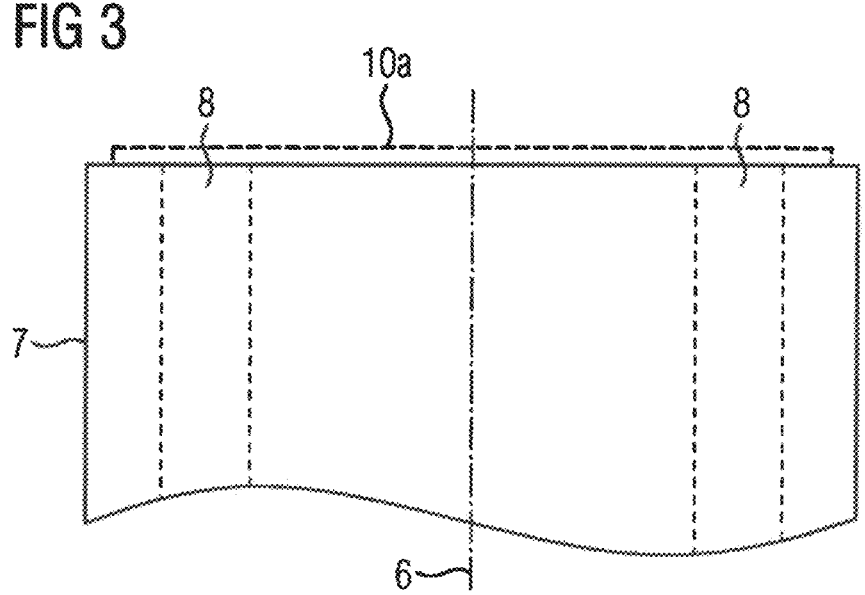

ELECTRICAL MACHINE HAVING A PLASTIC LAYER AS A PHASE SEPARATOR

CROSS-REFERENCES TO RELATED APPLICATIONS

This application Is the U.S. National Stage of International Application No. PCT/EP2019/069883, filed Jul. 24, 2019, which designated the United States and has been published as International Publication No. WO 2020/025414 A1 and which claims the priority of European Patent Application, Serial No. 18187323.3, filed Aug. 3, 2018, pursuant to 35 U.S.C. 119(a)-(d).

BACKGROUND OF THE INVENTION

The present invention is based on a production method for a stator of a rotary electrical machine,
   wherein the stator has a laminated core in which grooves for the windings of a multi-phase winding system are formed,
   wherein the windings of the individual phases are inserted one after the other sequentially into the grooves,
   wherein between the insertion of the windings of one of the phases and the insertion of the windings of the next phase, a respective insulating layer of plastic is sprayed at least onto the partial winding overhangs of the windings of the one phase.

The present invention is furthermore based on a stator of a rotary electrical machine,
   wherein the stator has a laminated core in which grooves for the windings of a multi-phase winding system are formed,
   wherein the windings of the phases are inserted into the grooves,
   wherein between the partial winding overhangs of the windings of phases inserted immediately one after the other, a respective insulating layer of plastic is arranged.

The present invention is furthermore based on a rotary electrical machine, wherein the electrical machine has a rotor and a stator.

Rotary electrical machines have a rotor and a stator. The stator has a laminated core in which grooves for the windings of a multi-phase winding system are formed. The windings of the individual phases are inserted sequentially one after the other into the grooves, that is to say in a customary three-phase winding system first the windings for the first phase, then the windings for the second phase and finally the windings for the third phase.

During the insertion of the windings of the respective phase, the partial winding overhangs of the windings of the respective phase are produced on both end faces of the stator. The partial winding overhangs, which are each arranged on one of the two end faces of the stator, form the respective winding head in their entirety. The individual wires of the windings are provided with a primary insulation, usually a wire enamel. As a result of the primary insulation, the dielectric strength of the phases with respect to one another and to earth or ground (the laminated core is usually at this potential) is achieved to a considerable extent. Furthermore, so-called surface insulating materials are used in the production of such electrical machines, for example, a so-called groove box and/or a so-called sliding cover and/or a so-called phase separator. The groove box is a U-shaped profile which is inserted into the associated grooves prior to the insertion of the windings of the respective phase. The sliding cover is a U-shaped profile which is placed over the windings of the respective phase located in the associated grooves after the insertion of the windings of the respective phase. The phase separators are used in the winding overhangs to insulate and thus separate the partial winding overhangs of the phases from one another.

In the prior art, the phase separators are generally designed as flat paper, which is intended to avoid direct contact between wires of different phases and thus with significantly different potential between the individual phases. This is to avoid partial discharges and breakdowns. It is likewise known to use a thin PET film as the surface insulating material. It is possible to use a pure PET film or a PET film which is coated with polyester fleece or PET film with a double-sided coating of aramid fibers. The last-mentioned film is available under the trade name Nomex, for example. The thickness of the PET film is usually between 0.1 mm and 1 mm.

In terms of production technology, the use of the groove boxes and the sliding cover is unproblematic. In particular, both the groove boxes and the sliding cover can be applied in a fully automated way. The phase separators, on the other hand, must be inserted manually in the prior art before the insertion of the windings of the next phase into the corresponding grooves. During the insertion of the windings of the next phase into the corresponding grooves, there is a risk of displacement of the phase separators. After the insertion of the windings of the next phase or after the insertion of the windings of all the phases, the position of the phase separators must therefore be checked again and possibly also corrected. In particular, errors frequently occur in the area of the groove outlet, that is to say, the front ends of the grooves, as the phase separator is displaced by the moving wire bundles during the insertion of the windings of the respective phase.

Another problem is the poor impregnability in the subsequent impregnation. As these are surface insulating materials, a throughflow of the liquid impregnation resin is not possible, or at least made more difficult. As a result, some larger accumulations of impregnation resin—so-called resin pockets—may arise in the area of the phase separators which do not cure, or at least not completely, during curing of the impregnation resin and are thus present in the finished electrical machine in uncured form. Areas can also arise in which impregnation resin does not flow, resulting in solidification not being produced in these areas. This may constitute a quality issue which may lead to failure of the electrical machine due to mechanical loads (for example, vibrations) due to thermal loads or due to electrical loads.

The use of a surface insulating material as a phase separator therefore has two significant disadvantages. One disadvantage is that production cannot be automated or can only be automated with difficulty and is prone to errors, so that manual testing as well as, in some cases, repairs are necessary. The other disadvantage is that a subsequent impregnation process does not run optimally as the phase separators impede the flow of the resin.

A production method of the aforementioned type, a stator of a rotary electrical machine of the aforementioned type and a rotary electrical machine of the aforementioned type are known from JP S61 207 160 A.

The object of the present invention is to create opportunities by means of which, based on the last-mentioned prior art, the insulating layers can be designed in such a way that, in an impregnation process subsequent to the application of the insulating layers, the easy throughflow of an impregnation resin is possible in a particularly problem-free and reliable manner.

SUMMARY OF THE INVENTION

According to one aspect of the invention, the object is achieved by a production method as set forth hereinafter. Advantageous embodiments of the production method are the subject of dependent claims.

According to the invention, in a production method of the aforementioned type, the insulating layers are each formed as a mesh-like structure having junctions and brace-like connections running between the junctions.

As a result of this procedure, not only the respective insulating layer can be limited to the area that is relevant, that is to say, to the area of the respective partial winding overhang or the partial winding overhangs. Above all, it is possible to apply the respective insulating layer as an "airy", loose structure so that the impregnation resin can flow without any problems in the subsequent impregnation process.

It is possible for the respective insulating layer to be sprayed exclusively onto the partial winding overhangs of the windings of the one phase, a respective insulating layer of plastic. However, it is also possible for the respective insulating layer to be sprayed onto the partial winding overhangs of all the windings already inserted at the time of spraying the respective insulating layer.

It is possible that only between the insertion of the windings of one of the phases and the insertion of the windings of the next phase, a respective insulating layer of plastic is sprayed at least onto the partial winding overhangs of the windings of the one phase. Alternatively, it is possible that before the windings of the first inserted phase are inserted, a further insulating layer of plastic is sprayed onto the laminated core and/or after the windings of the last inserted phase have been inserted, a further insulating layer of plastic is sprayed onto the partial winding overhangs of the windings of all the phases.

A mesh-like structure can be produced in a particularly simple manner in that the insulating layers each is made of a plurality of superimposed strands of the plastic. For this purpose, for example, the insulating layers can be applied by means of a nozzle head which has a rotating outlet nozzle for the plastic, wherein the plastic emerges from the rotating outlet nozzle in the form of a strand. In this case, the nozzle head is moved translationally as a whole during the emergence of the plastic from the rotating outlet nozzle.

The plastic may be as required, as long as it has the required mechanical and electrical properties. The plastic can therefore, within the framework of the required properties, be designed as a plastic which cross-links when exposed to moisture and/or on contact with the air or as a plastic which does not cross-link when exposed to moisture and/or on contact with the air.

A melting temperature or glass transition temperature (more precisely: the corresponding temperature range) of the plastic should be above the maximum operating temperature of the electrical machine. In particular, the melting temperature or glass transition temperature should therefore preferably be at least 120° C., better at least 150° C., in particular, at least 180° C., for example, at least 200° C.

The plastic can be a thermoplastic hot-melt adhesive, in particular a polyolefin. Alternatively, the plastic can be a thermoset. The thermoset can be, for example, a thermoset which cross-links under UV light at room temperature.

According to another aspect of the invention, the object is achieved by a stator of a rotary electrical machine as set forth hereinafter. Advantageous embodiments of the stator are the subject of dependent claims.

According to the invention, a stator of the aforementioned type is designed in that the insulating layers are each formed as a mesh-like structure having junctions and brace-like connections running between the junctions.

The advantages of the stator according to the invention correspond to those of the production method. The advantageous embodiments of the stator and the associated respective advantages also correspond to those of the production method.

According to still another aspect of the invention, the object is achieved by a rotary electrical machine as set forth hereinafter. According to the invention, the stator is designed as a stator according to the invention in a rotary electrical machine of the aforementioned type.

BRIEF DESCRIPTION OF THE DRAWING

The properties, features and advantages of this invention described above and the manner in which these are achieved, will become clearer and more clearly understood in connection with the following description of the exemplary embodiments, which are explained in more detail in connection with the diagrams. These show in diagrammatic view.

DETAILED DESCRIPTION OF PREFERRED EMBODIMENTS

Figure 1:
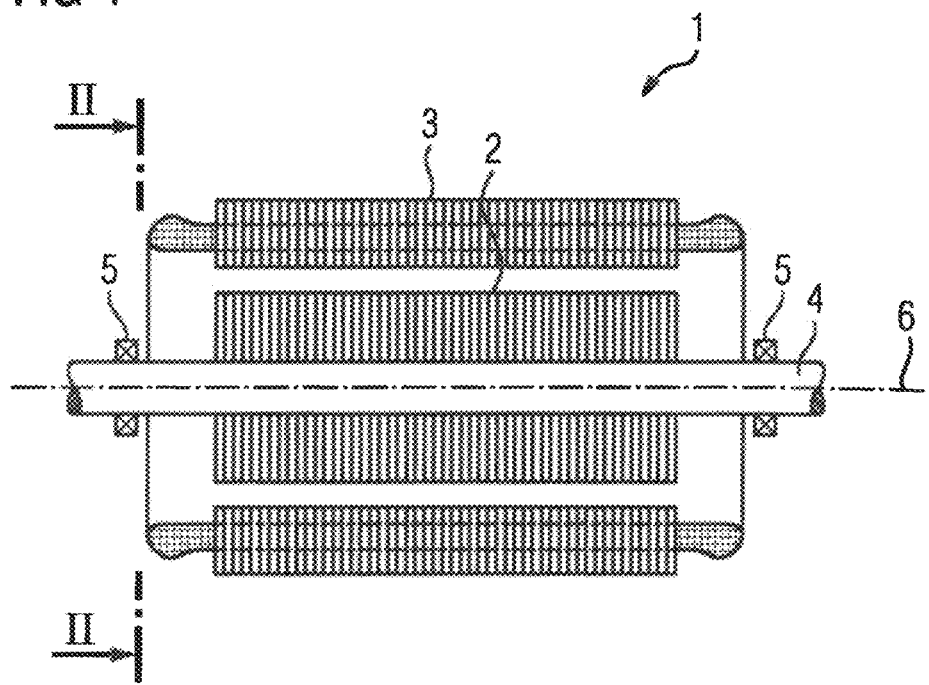
FIG. 1 A cross-section through a rotary electrical machine,
FIG. 2 A view of a laminated core from a direction II-III in FIG. 1,
FIG. 3 The laminated core of FIG. 2 from the side,
FIG. 4 A nozzle head from the side,
FIG. 5 A further nozzle head from the side,
FIG. 6 The laminated core of FIG. 2 with inserted windings of one phase,
FIG. 7 The laminated core of FIG. 6 from the side,
FIG. 8 The laminated core of FIG. 6 with an applied insulating layer,
FIG. 9 The laminated core of FIG. 8 from the side,
FIG. 10 The laminated core of FIG. 2 with inserted windings of two phases,
FIG. 11 The laminated core of FIG. 10 from the side,
FIG. 12 The laminated core of FIG. 10 with an applied insulating layer,
FIG. 13 The laminated core of FIG. 12 from the side,
FIG. 14 The laminated core of FIG. 2 with inserted windings of three phases,
FIG. 15 The laminated core of FIG. 14 from the side,
FIG. 16 A partially applied insulating layer,
FIG. 17 A partially applied insulating layer, and
FIG. 18 The nozzle head of FIG. 4 from the front.

According to FIG. 1, a rotary electrical machine 1 has a rotor 2 and a stator 3. The rotor 2 is arranged in a rotationally fixed manner on a rotor shaft 4, which in turn is rotatably mounted in bearings 5. The rotor shaft 4 and with it the rotor 2 can thus be rotated about an axis of rotation 6. A normally present housing, end shields and other components of subordinate importance within the scope of the present invention are not shown in FIG. 1.

Insofar as the terms "axial", "radial" and "tangential" are used hereinafter, they always refer to the axis of rotation 6.

"Axia" means a direction parallel to the axis of rotation 6. "Radial" means a direction orthogonal to the axis of rotation 5 directly towards or away from the axis of rotation 6. "Tangential" is a direction which is both orthogonal to the axial direction and orthogonal to the radial direction. "Tangential" is therefore a direction which is directed circularly around the axis of rotation 6 in a constant axial position and at a constant radial distance from the axis of rotation 6.

Both the rotor 2 and the stator 3 surround the axis of rotation 6. As a rule, the rotor 2 is arranged radially on the inside, and the stator 3 is arranged radially on the outside. In this case, the electrical machine 1 is designed as an internal rotor. However, the reverse arrangement is also possible. In this case, the electrical machine 1 is designed as an external rotor.

The stator 3 is manufactured in a manner which will be explained in more detail hereinafter in connection with the further figures.

To produce the stator 3, a laminated core 7 of the stator 3 is first produced. The laminated core 7 is produced in a conventional manner and therefore need not be explained in more detail. FIGS. 2 and 3 show the laminated core 7. Grooves 8 are inserted into the laminated core 7 according to FIGS. 2 and 3. Only a few of the grooves 8 are provided with their reference characters in FIG. 2. In FIG. 3 only the two grooves 8 which are outermost in the view of FIG. 3 are shown. The grooves 8 are initially still empty according to the illustration in FIGS. 2 and 3. In the course of the production of the stator 3, the windings 9a, 9b, 9c (see FIG. 6 to 15) of a multi-phase winding system are inserted into the grooves 8. The windings 9a, 9b, 9c of the individual phases are inserted one after the other sequentially into the grooves 8. As a rule, the winding system is three-phase.

It is possible for an insulating layer 10a to be applied to the laminated core 7 before the insertion of the windings 9a of the first phase, in accordance with the illustration in FIGS. 2 and 3. If this should be the case, the insulating layer 10a of plastic is sprayed onto the laminated core 7. Both during spraying as well as during an application of spray, the plastic is applied by means of a nozzle head 11 in accordance with the illustration in FIGS. 4 and 5, the nozzle head 11 having an outlet nozzle 12 for the plastic. The difference between spraying and an application of a spray is that during spraying, the plastic emerges from the outlet nozzle 12 as a jet or strand 13 corresponding to the illustration, while during an application of the spray, the plastic is atomized into small droplets through the outlet nozzle 12. Due to the fact that the insulating layer 10a Is only optionally present, it is only shown in FIG. 3 and also only in dashed lines there. The layer thickness of the insulating layer 10a can be selected as required. It can be in the range of 0.1 mm to 1 mm. In individual cases, these values may also be fallen short of or exceeded.

Figure 6:
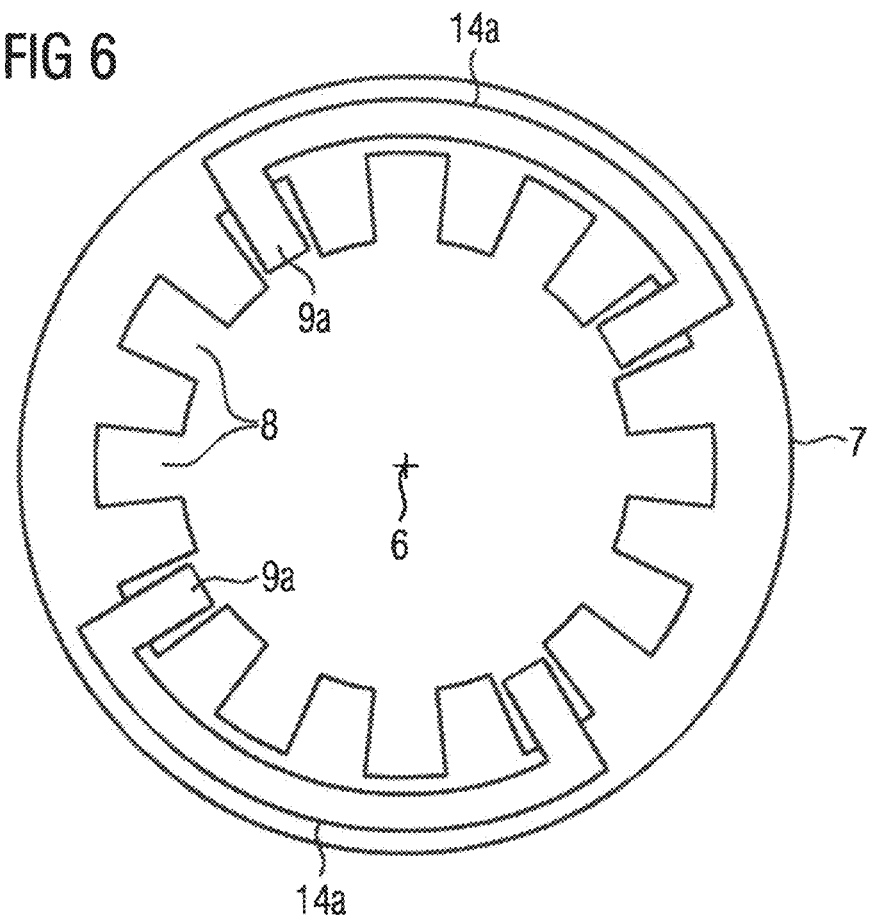
Figure 7:
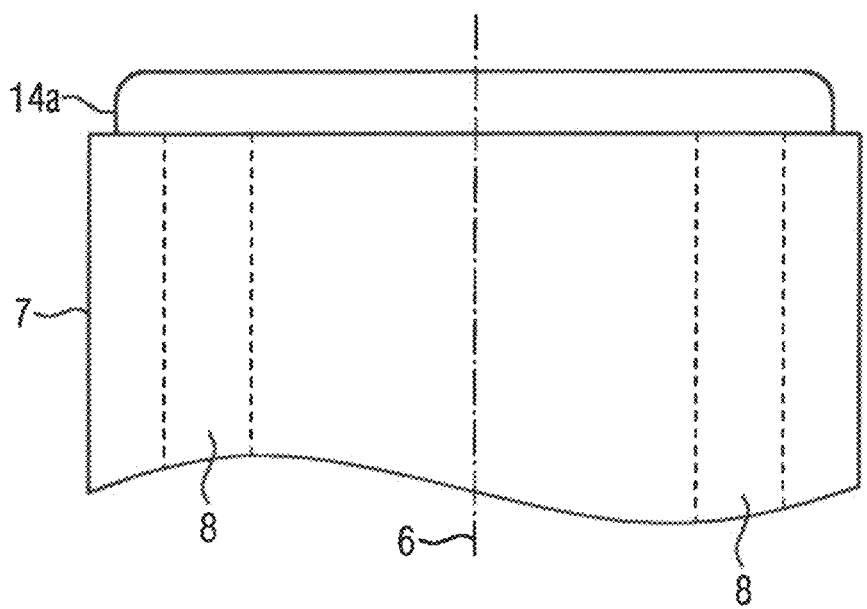

Next, the windings 9a of the first phase are inserted into the corresponding grooves 8. The insertion of the windings 9a of the first phase as such takes place in a conventional manner and therefore need not be explained in more detail. FIGS. 6 and 7 show the corresponding intermediate state during the production of the stator 3. Of particular importance is that parts of the windings 9a—the so-called partial winding overhangs 14a—project beyond the laminated core 7 in an axial direction. In the partial winding overhangs 14a, the wires of the windings 9a run from groove 8 to groove 8.

Figure 8:
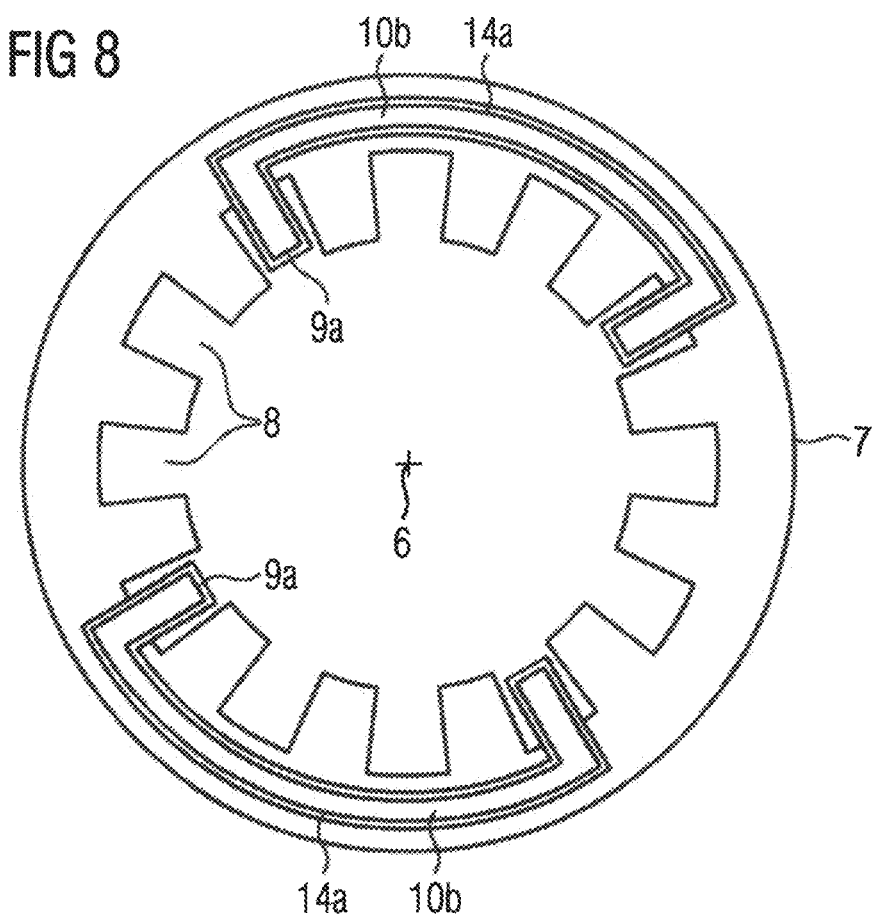
Figure 9:
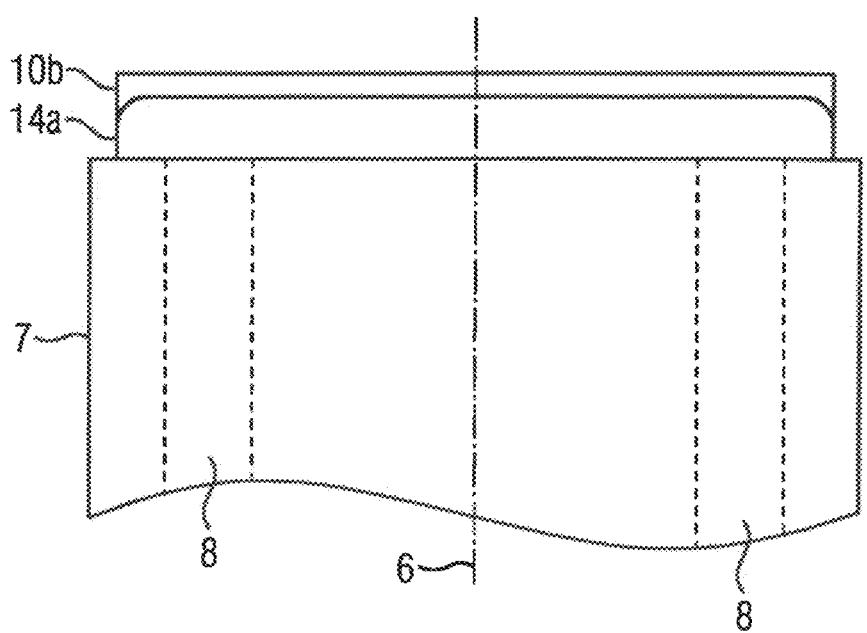

After the insertion of the windings 9a of the first phase, but before the insertion of the windings 9b of the second phase, an insulating layer 10b is applied to the partial winding overhangs 14a. FIGS. 8 and 9 show the corresponding state. The application of the insulating layer 10b takes place analogously to the application of the insulating layer 10a. However, in contrast to the insulating layer 10a, the insulating layer 10b Is always present. The insulating layer 10b is applied exclusively axially to the partial winding overhang 14a of the first phase in accordance with the illustration in FIGS. 8 and 9. As a rule, however, the insulating layer 10b is also applied radially on the inside and/or radially on the outside to the partial winding overhang 14a of the first phase.

Figure 10:
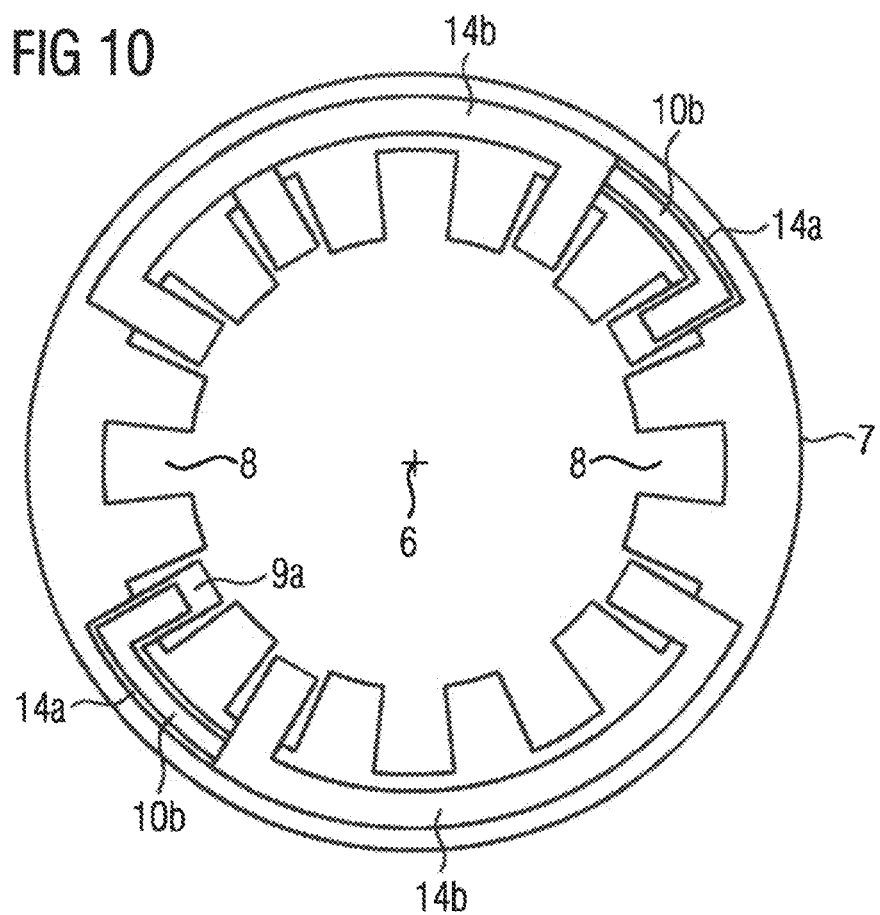
Figure 11:
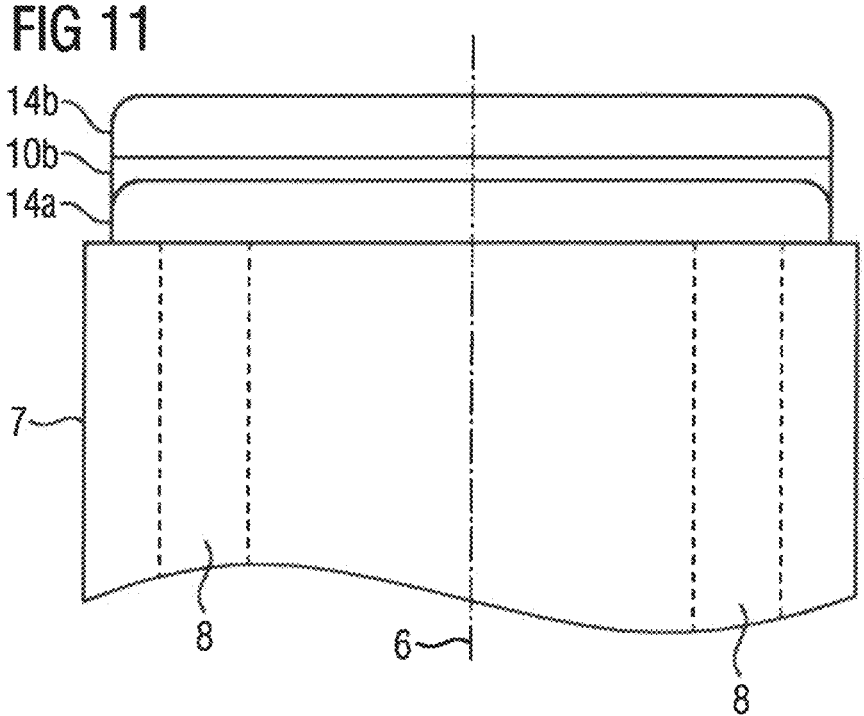

After the application of the insulating layer 10b, the windings 9b of the second phase are inserted into the corresponding grooves 8. The insertion of the windings 9b of the second phase as such takes place in a conventional manner and therefore need not be explained in more detail. FIGS. 10 and 11 show the corresponding intermediate state during the production of the stator 3. Of particular importance is that parts of the windings 9b—the partial winding overhangs 14b—project beyond the laminated core 7 in an axial direction. In the partial winding overhangs 14b, the wires of the windings 9b run from groove 8 to groove 8.

Figure 12:
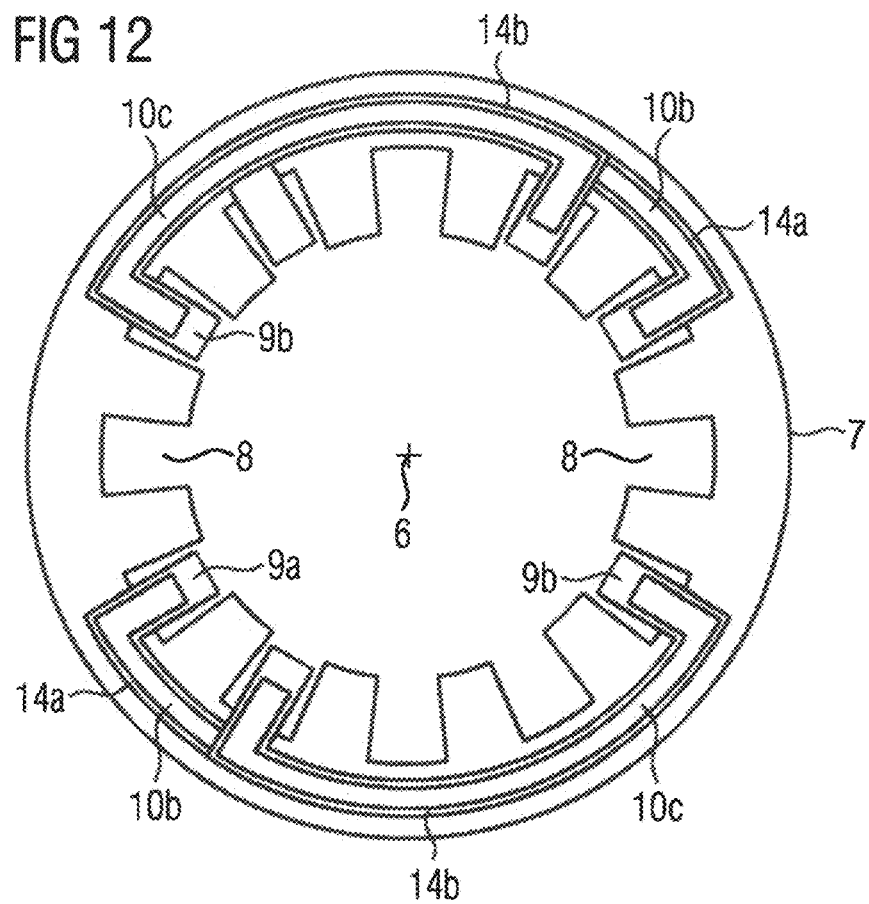
Figure 13:
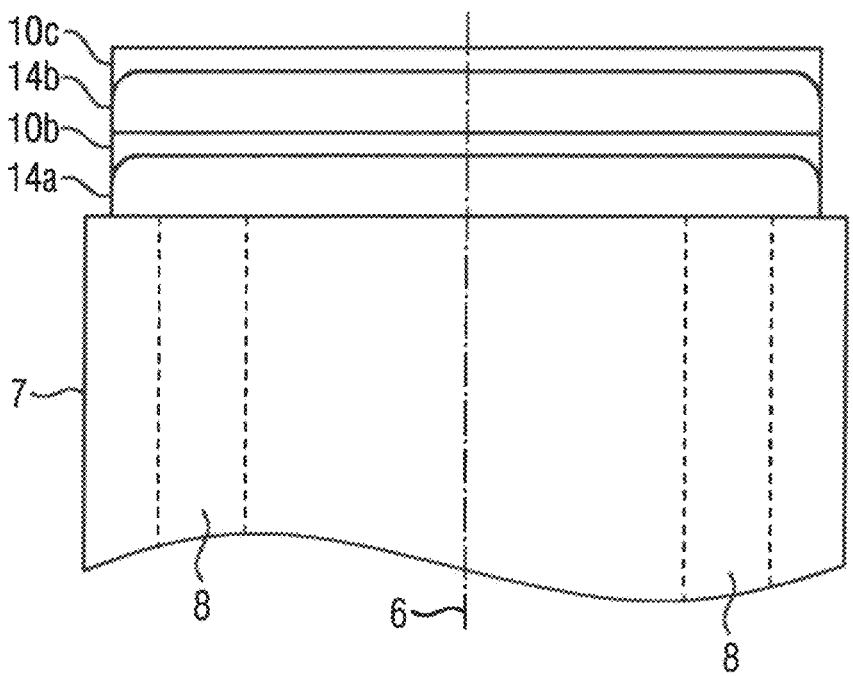

After the insertion of the windings 9b of the second phase, but before the insertion of the windings 9c of the third phase, an insulating layer 10c is applied to the partial winding overhangs 14b. FIGS. 12 and 13 show the corresponding state. The application of the insulating layer 10c takes place analogously to the application of the insulating layer 10a. Analogously to the insulating layer 10b, the insulating layer 10c is always present. Analogously to the insulating layer 10b, the insulating layer 10c is applied exclusively axially to the partial winding overhang 14b of the second phase in accordance with the illustration in FIGS. 12 and 13. As a rule, however, the insulating layer 10c is also applied radially on the inside and/or radially on the outside to the partial winding overhang 14b of the second phase.

It is possible for the insulating layer 10c to be exclusively applied to the partial winding overhangs 14b of the windings 9b of the second phase. Alternatively, however, it is also possible for the insulating layer 10c to additionally also be applied to the partial winding overhangs 14a of the windings 9a of the first phase.

Figure 14:
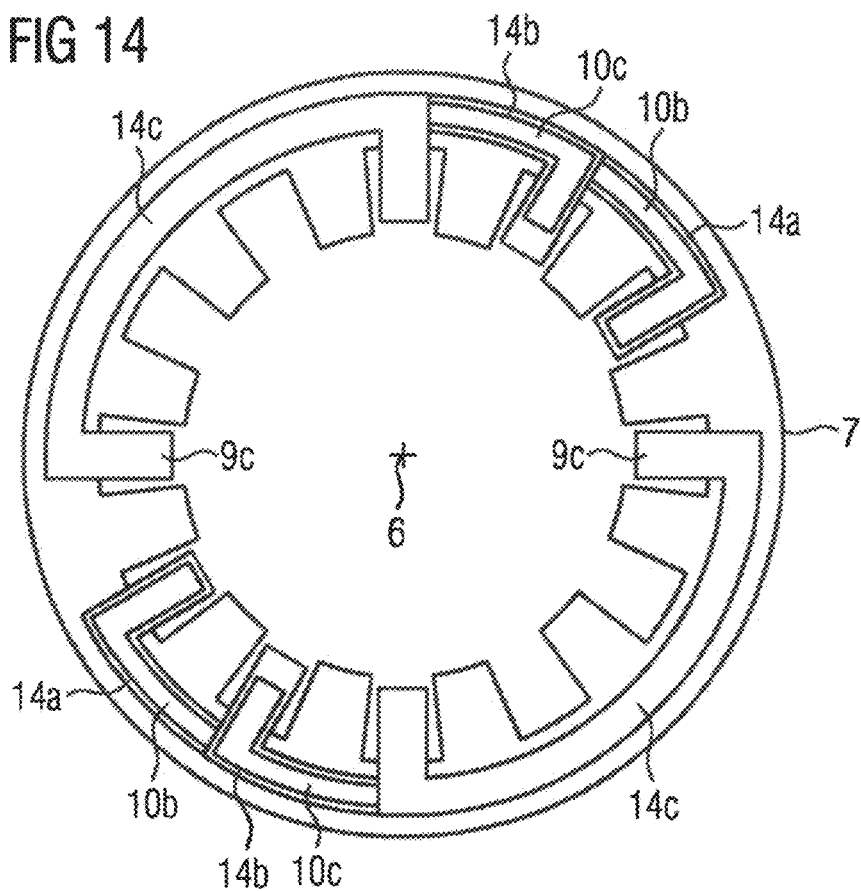
Figure 15:
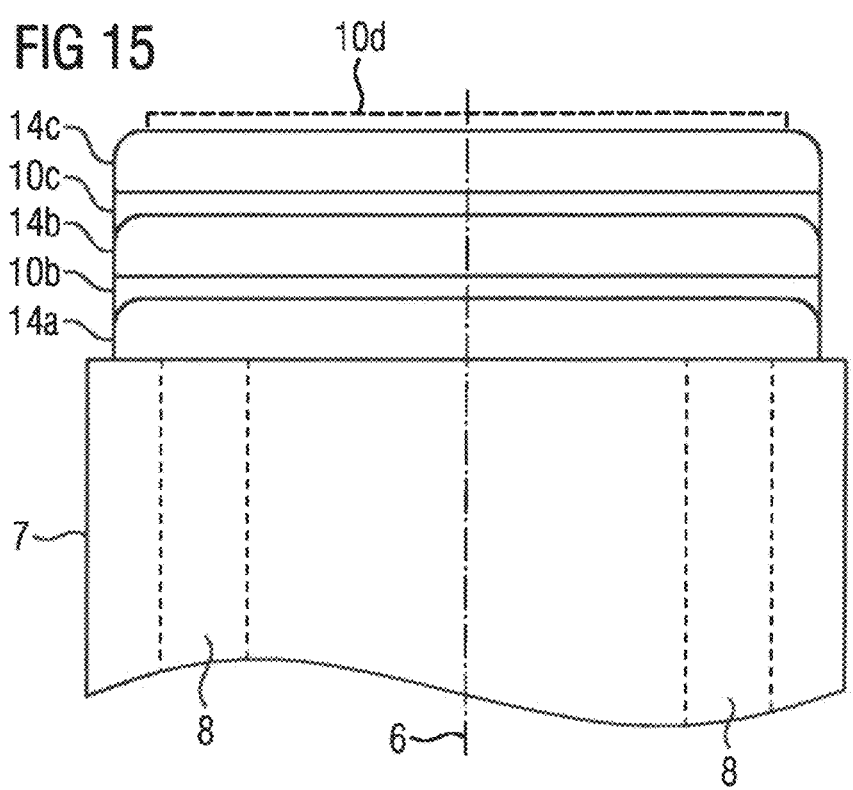

After the application of the insulating layer 10c, the windings 9c of the third phase are inserted into the corresponding grooves 8. The insertion of the windings 9c of the third phase as such takes place in a conventional manner and therefore need not be explained in more detail. FIGS. 14 and 15 show the corresponding state in the production of the stator 3. Of particular importance is that parts of the windings 9c—the partial winding overhangs 14c—project beyond the laminated core 7 in an axial direction. In the partial winding overhangs 14c, the wires of the windings 9c run from groove 8 to groove 8.

The production method according to the invention is completed with the insertion of the windings 9c of the third phase. However, it is possible for an insulating layer 10d to be applied to the partial winding overhangs 14a to 14c after the insertion of the windings 9a to 9c of the phases. If this should be the case, the insulating layer 10d is sprayed analogously to the other insulating layers 10a to 10c. Due to the fact that the insulating layer 10d is only optionally present, it is only shown in FIG. 15 and also only in dashed lines there. It is possible for the insulating layer 10d to be applied exclusively axially to the partial winding overhangs 14a to 14c. Alternatively, however, it is also possible for the insulating layer 10d to additionally also be applied radially on the inside and/or radially on the outside to the partial winding overhangs 14a to 14c.

Furthermore, finally, impregnation in casting resin can also be carried out. This step is likewise conventional and therefore need not be explained in more detail.

Due to the manner of production according to the invention of the stator 3, a respective insulating layer 10b, 10c of plastic is arranged between the partial winding overhangs 14a to 14c of phases inserted immediately one after the other. With respect to the respective insulating layer 10b, 10c, the insulating layers 10b, 10c are therefore each arranged between all the partial winding overhangs 14a, 14b arranged closer to the stator 3 and the partial winding overhangs 14b, 14c arranged further from the stator 3. The same applies to the insulating layers 10a, 10d, but with the difference that here the division has degenerated, as in both these cases, with respect to the respective insulating layer 10a, 10d, all the partial winding overhangs 14a to 14c are arranged on the same side of the respective insulating layer 10a, 10d.

Figure 16:
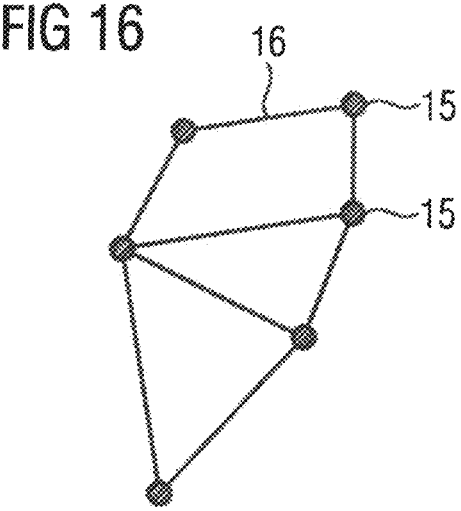

In accordance with the illustration in FIG. 16, the insulating layers 10a to 10d are each formed as a mesh-like structure having junctions 15 and brace-like connections 16. The brace-like connections 16 each extend between the Junctions 15. For example, the insulating layers 10a to 10d can each be made of a plurality of superimposed strands 13 of the plastic in accordance with the illustration in FIG. 17.

Figure 4:
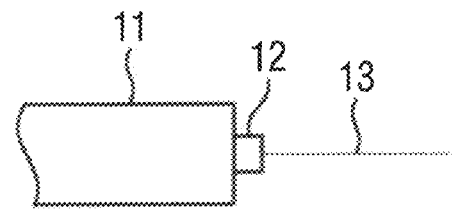
Figure 5:
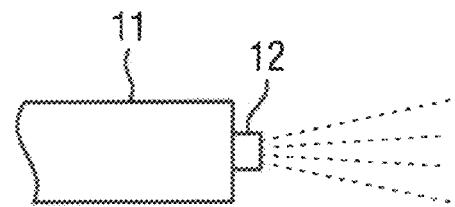
Figure 17:
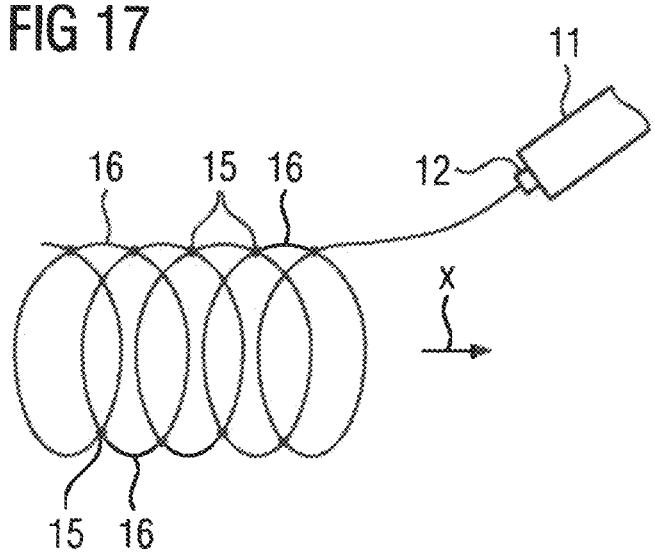
Figure 18:
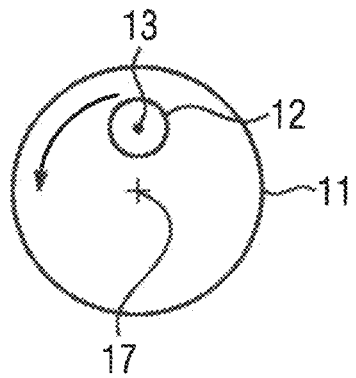

In order to apply such a mesh-like structure, the nozzle head 11 is preferably designed according to FIG. 4, so that the plastic emerges from the outlet nozzle 12 as a jet or strand 13. In particular, in accordance with the illustration in FIG. 18, see FIG. 4 in addition, it is possible for the nozzle head 11 to have a rotating outlet nozzle 12. In this case, the outlet nozzle 12 is rotated about an axis 17, to be precise, while the plastic is emerging from the rotating outlet nozzle 12. Furthermore, the nozzle head 11 is moved translationally as a whole during the emergence of the plastic from the rotating outlet nozzle 12. This is indicated in FIG. 17 by a direction arrow x. In this case, the insulating layers 10a to 10d are comprised of a plurality of coherent rings having a diameter which are each offset from one another by an offset. During a complete rotation of the outlet nozzle 12 about the axis 17, the nozzle head 11 is preferably only moved by an offset which is smaller than the diameter.

As such, the plastic can be determined as required. For example, it can be a plastic which cross-links when exposed to moisture and/or on contact with the air. However, it can also be a plastic which does not cross-link when exposed to moisture and/or on contact with the air. The melting temperature of the plastic should preferably be at least 120° C., better at least 150° C., in particular, at least 180° C., for example, at least 200° C. The same applies to the glass transition temperature which—in particular, in the case of a thermoplastic hot-melt adhesive—is below the melting temperature or—in particular, in the case of a thermoset—below the decomposition temperature. Such plastics are known to persons skilled in the art. For example, the plastic can be a thermoplastic hot-melt adhesive, in particular a polyolefin. Alternatively, it can be a thermoset, in particular a thermoset which cross-links under UV light at room temperature.

The size and nature of the insulating layers 10a to 10d can be adjusted as required. The following, in particular, have an influence on the size and nature of the insulating layers 10a to 10d,
the type of plastic used,
the temperature of the plastic when it emerges from the outlet nozzle 12,
the injection pressure with which the plastic emerges from the outlet nozzle 12,
the speed with which the plastic emerges from the outlet nozzle 12,
the speed at which the outlet nozzle 12 rotates, and
the speed at which the nozzle head 11 is moved translationally.

In a specific experiment, for example, an adhesive based on polyolefin having a melting temperature of approx. 200° C. was used. The temperature of the plastic when it emerged from the outlet nozzle 12 was 220° C., the injection pressure 3 bar. The plastic emerged from the outlet nozzle 12 as a strand 13 at a speed of approx. 5m/s. The distance of the outlet nozzle 12 from the respective substrate was approx. 8 cm, the speed of the outlet nozzle 12 was 600 revolutions/min. The translational speed was 3 cm/s. The applied insulating layers 10a to 10d adhered very well to their substrate. Slipping during insertion of the next windings 9a to 9c was not observed.

In summary, the present invention thus relates to the following facts:

A stator 3 of a rotary electrical machine 1 has a laminated core 7, in which grooves 8 for the windings 9a to 9c of a multi-phase winding system are formed. The windings 9a to 9c of the individual phases are inserted one after the other sequentially into the grooves 8. Between the insertion of the windings 9a, 9b of one of the phases and the insertion of the windings 9b, 9c of the next phase, an insulating layer 10b, 10c of plastic is sprayed at least onto the partial winding overhangs 14a, 14b of the windings 9a, 9b of the one phase. The insulating layers 10a to 10d are each formed as a mesh-like structure having junctions 15 and brace-like connections 16 running between the junctions 15.

The present invention has many advantages. In particular, the production method according to the invention can be fully automated. The application of the insulating layers 10a to 10d can be carried out, for example, by means of a robot. The insulating layers 10a to 10d can furthermore be easily applied as a porous structure, so that a flat, fused grid network is formed from the junctions 15 and the brace-like connections 16. The insulating layers 10a to 10d have very good adhesion to the respective substrate (laminated core 7 and partial winding overhangs 14a to 14c). The insulating layers 10a to 10d are therefore bonded to their substrate. They have already cooled a few seconds after application and are then tack-free. On the other hand, they are not bonded to the partial winding overhang 14a to 14c resting on them.

Although the invention has been illustrated and described in more detail by the preferred exemplary embodiment, the invention is not limited by the disclosed examples and other variations may be derived therefrom by a person skilled in the art without departing from the scope of the invention.

What is claimed is:

1. A method for producing a stator of a rotary electrical machine, said method comprising:
   inserting windings of individual phases sequentially into grooves of a laminated core to form a multi-phase windings system; and
   spraying between insertion of a one of the windings of one of the phases and insertion of a one of the windings of a next one of the phases an insulating layer of plastic at least onto a partial winding overhang of the windings, such that the insulating layer forms a mesh-like structure having junctions and brace-like connections running between the junctions.

2. The method of claim 1, wherein the insulating layer is sprayed onto the partial winding overhang of all the windings that have already been inserted at a time of spraying the insulating layer.

3. The method of claim 1, further comprising spraying a further insulating layer of plastic onto the laminated core before the windings are inserted into the grooves, such that the further insulating layer forms a mesh-like structure having junctions and brace-like connections running between the junctions.

4. The method of claim 1, further comprising spraying a further insulating layer of plastic onto partial winding overhangs of the wings of all phases after insertion of the windings into the grooves, such that the further insulating layer forms a mesh-like structure having junctions and brace-like connections running between the junctions.

5. The method of claim 1, wherein the insulating layer comprises a plurality of superimposed strands of plastic.

6. The method of claim 1, further comprising moving a nozzle head translationally as the insulating layer is sprayed via a rotating outlet nozzle of the nozzle head and the plastic emerges from the rotating outlet nozzle in the form of a strand.

7. The method of claim 1, wherein the plastic is a plastic which cross-links when exposed to moisture and/or on contact with air, or a plastic which does not cross-link when exposed to moisture and/or on contact with air.

8. The method of claim 1, wherein the plastic has a melting temperature or glass transition temperature of at least 120° C.

9. The method of claim 1, wherein the plastic is a thermoplastic hot-melt adhesive or a thermoset.

10. The method of claim 1, wherein the plastic has a melting temperature or glass transition temperature of at least 150° C.

11. The method of claim 1, wherein the plastic has a melting temperature or glass transition temperature of at least 180° C.

12. The method of claim 1, wherein the plastic has a melting temperature or glass transition temperature of at least 200° C.

13. The method of claim 1, wherein the thermoplastic hot-melt adhesive is a polyolefin, or wherein the thermoset cross-links under UV light at room temperature.

14. A stator of a rotary electrical machine, said stator comprising:
a laminated core having grooves;
windings inserted into the grooves for forming a multi-phase winding system; and
an insulating layer made of plastic and sprayed between partial winding overhangs of the windings of phases inserted immediately one after the other, said insulating layer formed as a mesh-like structure having junctions and brace-like connections running between the junctions.

15. The stator of claim 14, wherein the insulating layer is arranged between the partial winding overhangs arranged closer to the stator and the partial winding overhangs arranged further from the stator.

16. The stator of claim 14, further comprising a further insulating layer made of plastic and arranged between the laminated core and the partial winding overhangs of the windings, said further insulating layer formed as a mesh-like structure having junctions and brace-like connections running between the junctions.

17. The stator of claim 14, further comprising a further insulating layer made of plastic and arranged on the partial winding overhangs of the windings on a side facing away from the laminated core, said further insulating layer formed as a mesh-like structure having junctions and brace-like connections running between the junctions.

18. The stator of claim 14, wherein the insulating layer comprises a plurality of superimposed strands of the plastic.

19. The stator of claim 14, wherein the insulating layer comprises a plurality of coherent rings having a diameter, said coherent rings arranged offset from one another by an offset sized smaller than the diameter.

20. The stator of claim 14, wherein the plastic is a plastic which cross-links when exposed to moisture and/or on contact with air.

21. The stator of claim 14, wherein the plastic is a plastic which does not cross-link when exposed to moisture and/or on contact with air.

22. The stator of claim 14, wherein the plastic has a melting temperature or glass transition temperature of the plastic is at least 120° C.

23. The stator of claim 14, wherein the plastic is a thermoplastic hot-melt adhesive or a thermoset.

24. The method of claim 14, wherein the thermoplastic hot-melt adhesive is a polyolefin, or wherein the thermoset cross-links under UV light at room temperature.

25. A rotary electrical machine, comprising:
a rotor; and
a stator interacting with the rotor and comprising a laminated core having grooves, windings inserted into the grooves for forming a multi-phase winding system, and an insulating layer made of plastic and sprayed between partial winding overhangs of the windings of phases inserted immediately one after the other, said insulating layer formed as a mesh-like structure having junctions and brace-like connections running between the junctions.

* * * * *